United States Patent
Bippus et al.

(10) Patent No.: US 9,478,049 B2
(45) Date of Patent: Oct. 25, 2016

(54) METHOD FOR LOCAL ADJUSTMENT OF REGULARIZATION PARAMETERS FOR IMAGE QUALITY OPTIMIZATION IN FULLY 3D ITERATIVE CT RECONSTRUCTION

(71) Applicant: KONINKLIJKE PHILIPS N.V., Eindhoven (NL)

(72) Inventors: Rolf Dieter Bippus, Hamburg (DE); Berhard Johannes Brendel, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/917,611

(22) PCT Filed: Sep. 25, 2014

(86) PCT No.: PCT/EP2014/070424
§ 371 (c)(1),
(2) Date: Mar. 9, 2016

(87) PCT Pub. No.: WO2015/044237
PCT Pub. Date: Apr. 2, 2015

(65) Prior Publication Data
US 2016/0225169 A1    Aug. 4, 2016

(30) Foreign Application Priority Data
Sep. 30, 2013    (EP) .................... 13186649

(51) Int. Cl.
*G06K 9/00* (2006.01)
*G06T 11/00* (2006.01)

(52) U.S. Cl.
CPC ............ *G06T 11/005* (2013.01); *G06T 11/006* (2013.01); *G06T 2211/424* (2013.01)

(58) Field of Classification Search
None
See application file for complete search history.

(56) References Cited

U.S. PATENT DOCUMENTS

| | | |
|---|---|---|
| 6,324,242 B1 | 11/2001 | Pan |
| 2006/0215891 A1 | 9/2006 | Fessler |
| 2011/0293158 A1 | 12/2011 | Popescu |
| 2012/0128265 A1 | 5/2012 | Silver |
| 2013/0010917 A1 | 1/2013 | Thibault |
| 2013/0101190 A1 | 4/2013 | Shi |
| 2013/0336562 A1* | 12/2013 | Zamyatin .............. G06T 11/006 382/131 |

(Continued)

FOREIGN PATENT DOCUMENTS

| | | |
|---|---|---|
| WO | 2012/017345 | 2/2012 |
| WO | 2013/002805 | 1/2013 |
| WO | 2013/088294 | 6/2013 |

OTHER PUBLICATIONS

Fessler, et al., "Spatial Resolution Properties of Penalized-Likelihood Image Reconstruction: Space-Invariant Tomorgraphs", IEEE Transactions on Image Processing, 1996.

(Continued)

*Primary Examiner* — Stephen R Koziol
*Assistant Examiner* — Sean Conner (57) ABSTRACT

A method and related apparatus (116) for iterative reconstruction of a volume. A regularization parameter (β) of an iterative update function is spatially adapted and normalized in respect to a region of interest ROI in the volume. The method allows achieving essentially uniform noise distribution across the reconstructed volume.

14 Claims, 5 Drawing Sheets

(56) References Cited

U.S. PATENT DOCUMENTS

| | | | |
|---|---|---|---|
| 2015/0003696 A1* | 1/2015 | Matthews | G06T 7/003 382/128 |
| 2015/0030227 A1* | 1/2015 | Liang | G06T 11/006 382/131 |

OTHER PUBLICATIONS

Kadrmas, "Statistically regulated and adaptive EM reconstructions for emission computed tomography", IEEE Transactions on Nuclear Science, vol. 48, No. 3, Jun. 2001.

Stayman, et al., "Regularization for uniform spatial resolution properties in penalized-likelihood image reconstruction", IEEE Transactions on Medical Imaging, vol. 19, No. 6, Jun. 2000.

Charest, et at., "On Iterative Regularization on Its Application", IEEE Transactions on Circuits and Systems for Video Technology, vol. 18, No. 3, Mar. 2008.

Carsten O. Schirra, et al., "Statistical Reconstruction of Material Decomposed Data in Spectral CT", IEEE Transactions on Medical Imaging, vol. 32, No. 7.

Jerebko, et al., "Regularization Parameter Selection in Maximum a Posteriori Iterative Reconstruction for Digital Breat Tomosynthesis", Jun. 2010.

He, et al., "Adaptive regularized Map of CT image reconstruction method", Computer Engineering and Applications, 2011.

Shi, et al., "Quadratic Regularization Design for 2-D CT", IEEE Transactions on Medical Imaging, vol. 28, No. 5, May 2009.

Wunderlich, et al., "Achieving Uniform Noise in Direct Fan-beam CT reconstruction Through Bowtie Filter Design", 2007 IEEE Nuclear Science Symposium Conference Record.

Chun, et al., "Spatial Resolution Properties of Motion-Compensated Tomographic Image Reconstruction Methods", IEEE Transactions on Medical Imaging, vol. 31, No. 7, Jul. 2012.

Fessler, "Analytical Approach to Regularization Design for Isotropic Spatial Resolution", 2004 IEEE.

Nuyts, et al., "A Penalized-Likelihood Image Reconstruction Method for Emission Tomography, Compared to Postsmoothed Maximum-Likelihood With Matched Spatial Resolution", IEEE Transactions on Medical Imaging, vol. 22, No. 9, Sep. 2003.

* cited by examiner

METHOD FOR LOCAL ADJUSTMENT OF REGULARIZATION PARAMETERS FOR IMAGE QUALITY OPTIMIZATION IN FULLY 3D ITERATIVE CT RECONSTRUCTION

CROSS REFERENCE TO RELATED APPLICATIONS

This application is the U.S. National Phase application under 35 U.S.C. §371 of International Application No. PCT/EP2014/070424, filed Sep. 25, 2014, published as WO 2015/044237 on Apr. 2, 2015, which claims the benefit of European Patent Application Number 13186649.3 filed Sep. 30, 2013. These applications are hereby incorporated by reference herein.

FIELD OF THE INVENTION

The invention relates to a CT image reconstruction method, to an image processing apparatus, to a computer program element, and to a computer readable medium.

BACKGROUND OF THE INVENTION

In computed tomography, there are a range of different reconstruction algorithms for computing cross-sectional images (also known as "slices") from projection data of an object gathered during measurement at a detector of a CT scanner. There are reconstruction algorithms that iteratively build up a final image from an initial image. Some iterative reconstruction algorithms use regularization. The regularized "reconstruction problem", that is, "Given a constraint on image property, how does one get from the initial image to the final image?", is commonly formulated in terms of minimizing a cost function consisting of a data term and a regularization term. A further algorithmic variant is regularized statistical iterative reconstruction, where the data term accounts for a statistical model of the noise of the underlying measurements while the regularization term incorporates a-priory knowledge about the image to reconstruct. WO 2013088294 A1 describes such a statistical iterative reconstruction algorithm. It has been observed however that statistical model and regularization may lead to certain image properties like local resolution or SNR (signal-to-noise-ratio) to vary over the image in an undesirable way. A number of approaches have been proposed to enforce for instance uniformity of resolution such as J A Fessler et al in "Spatial Resolution Properties of Penalized-Likelihood Image Reconstruction: Space-Invariant Tomographs", IEEE Transactions on Image Processing, 1996, 5, 1346-1358.

SUMMARY OF THE INVENTION

There may therefore be a need for an alternative image reconstruction method and related apparatus.

The object of the present invention is solved by the subject matter of the independent claims where further embodiments are incorporated in the dependent claims. It should be noted that the following described aspect of the invention equally applies to the image processing system, to the computer program element and to the computer readable medium.

According to a first aspect of the invention there is provided a CT image processing method, including the following steps of:

receiving projection data acquired of a volume along a scan direction. One or more image points of said volume reconstructable, in an iterative reconstruction operation, from at least a part of said projection data;

as a function of a position in a volume reconstructed in a previous iteration or otherwise reconstructed, computing a regularization parameter for an image point at said position for a next iteration in said iterative reconstruction operation;

as a function of a scan position long the scan direction, normalizing the regularization parameter relative to a region of interest, ROI, of an object in a plane (for instance a slice) across the volume at said scan position;

when iteratively reconstructing, in said next iteration, said image point from the projection data for, applying said normalized regularization parameter. The reconstructed volume is an image of the scanned volume.

According to one embodiment, the computing of the regularization parameter is a function of noise behavior or noise level in that part of the projection data that is reconstructable for said image point.

More particularly, the regularization parameter (and/of the normalization) is computed from back-projections of statistical variances obtained from at least that part the projection data that reconstructs for the image point. However, using variances is a non-limiting example to capture the noise level or behavior and other suitable statistical quantities may likewise be used instead of or alongside with variances.

In iterative reconstruction, there is i) a data term that varies with how well a forward projected image point estimate (generated during the iterations) matches the actually measured projection data and ii) a regularization term that enforces expected image characteristics such as smoothness by returning a response for each estimated image point. The regularization parameter is then to control the strength of said response by multiplicative or additive combination with the regularizer's response.

In one embodiment, the spatially dependent computing results in a locally varying of said regularization parameter across image points in said plane and the so computed regularization parameter acts in the iterative reconstruction in such a manner so as to bias the reconstruction for estimates with more uniform noise appearance within the slice. At the same time, the normalization in scan direction of the so computed reconstruction parameter acts so as to maintain in a statistical sense the balance between the data term (which may be considered a token for the fidelity of the estimated image points) and the regularization term during the course of the iterations. For instance, for scan positions where essentially all measurements are less noisy due to smaller patient/object dimensions (such as the periphery or in tapered objects) or low radiodensity regions (such as the chest region) would otherwise receive significant over-smoothing (too high betas).

For instance, and according to one embodiment, the normalization step includes computing regularization parameters for a further image point in the ROI and for further image points in the ROI in a second plane at a second scan position such that the mean or a weighted mean of the regularization parameters relative to said ROI in the first plane essentially equal the mean or a weighted mean of the regularization parameters relative to said ROI in the second plane.

According to one embodiment, the method further includes the step of identifying said ROI in a cross-sectional image through a volume from the or any previous iteration or from a reference cross-sectional image previously obtained by a different reconstruction method.

In one embodiment, for each scan position, the normalization of the regularization parameter is only relative to said ROI in said plane at said scan position. More particularly, scaling parameters used in the normalization are computed relative to the ROI in each plane (or "slice") only. The application of the scaling factors itself is however done across all image points in the respective slice or scan position.

According to one embodiment, the ROI is pre-computed or user defined based on the volume or on a volume from any previous iteration or is pre-computed from a cross-sectional image reconstructed in a previous iteration. The ROI may be computed in one embodiment by thresholding. In one embodiment, the region of interest is i) a portion of the object of a specific tissue type, in particular soft tissue, or ii) a specific anatomical region or structure. In one embodiment, the ROI is typically a part (not necessarily connected and/or may have holes) of a region defined by the intersection of the object with the respective plane considered.

In one embodiment the ROI is computed to exclude i) image data representative of a peripheral region of said object in said plane or ii) excludes image points representative of an object portion having an attenuation coefficient lower than a threshold or iii) excludes image data representative of object background.

According to one embodiment, the extent or width of the peripheral region in the ROI that is to be disregarded for the normalization is user adjustable in one embodiment. In one embodiment, the width of the peripheral region remains constant for each sliced/plane or is adapted as a function of the scan position or as a function of other quantities such as image quality metrics. The method as proposed herein cuts out certain non-regions of interest that may otherwise unfavorably diminish or even nullify the desired effects of the normalization. This can be done in one embodiment, by computing a mask that erodes or otherwise modifies the threshold ROI image portions to exclude the areas mentioned above.

According to one embodiment, the computing of the regularization parameter and/or the corresponding normalization includes re-using one or more terms, said one or more terms previously formed in the or a previous iteration for updating a previous estimate for the image point. This allows for a more efficient computation.

According to one embodiment, the regularization parameter or the normalization of the regularization parameter are computed from a parameterized first function of one or more back-projections of a parameterized second function of statistical variances obtained from the projection data.

According to one embodiment, the parameterized second function is an exponential function with the exponent being either a fixed or an adjustable parameter p. In particular embodiment, p=½, in other words, the second function is essentially the square root of the back-projected inverse statistical variances of the projection data. In one embodiment it only either the first (via the second function) or the second parameterization (via the second function) that is variable, but in preferred embodiment both parameterizations are variable. The singly or doubly parameterization add a degree of freedom to better adapt the method to specific applications or noise situations.

In one embodiment, the so calculated regularization parameters are either calculated on an image grid that differs in resolution (typically lower) from the image to be reconstructed or are re-sampled to this typically lower resolution after calculation on the original grid. During the iterative reconstruction update, the local regularization parameter is then calculated via interpolation from the calculated or represented values. This allows saving memory and CPU time.

In sum, the spatially varying of regularization parameters and the normalization (or scaling) of same in respect of regions of interest together combines for a better noise/resolution trade-off and thus better dose utility across scans with varying total attenuation profile. Having a uniform noise distribution across the reconstructed image and yet not giving away resolution in image portions that afford it without violating the dosage constraint is of particular benefit in image based intelligence gathering such diagnostics. The human image analyst is not "coaxed" into a false sense of security by an image that appears throughout at uniform resolution and therefore "trustworthy". Very much unlike uniform-resolution-only approaches to image production, the proposed method yields imagery that "indicates" to the user which image portions they can trust by having them appear at higher resolution than those portions where noise is more prevalent.

According to one embodiment, the numbers in the projection data encode attenuation obtained during a phase retrieval step in a differential phase contrast imaging operation. According to one alternative embodiment, the numbers in the projection data encode projections of small scatter or projection of the phase gradient.

BRIEF DESCRIPTION OF THE DRAWINGS

Exemplary embodiments of the invention will now be described with reference to the following drawings wherein.

DETAILED DESCRIPTION OF EMBODIMENTS

Figure 1:
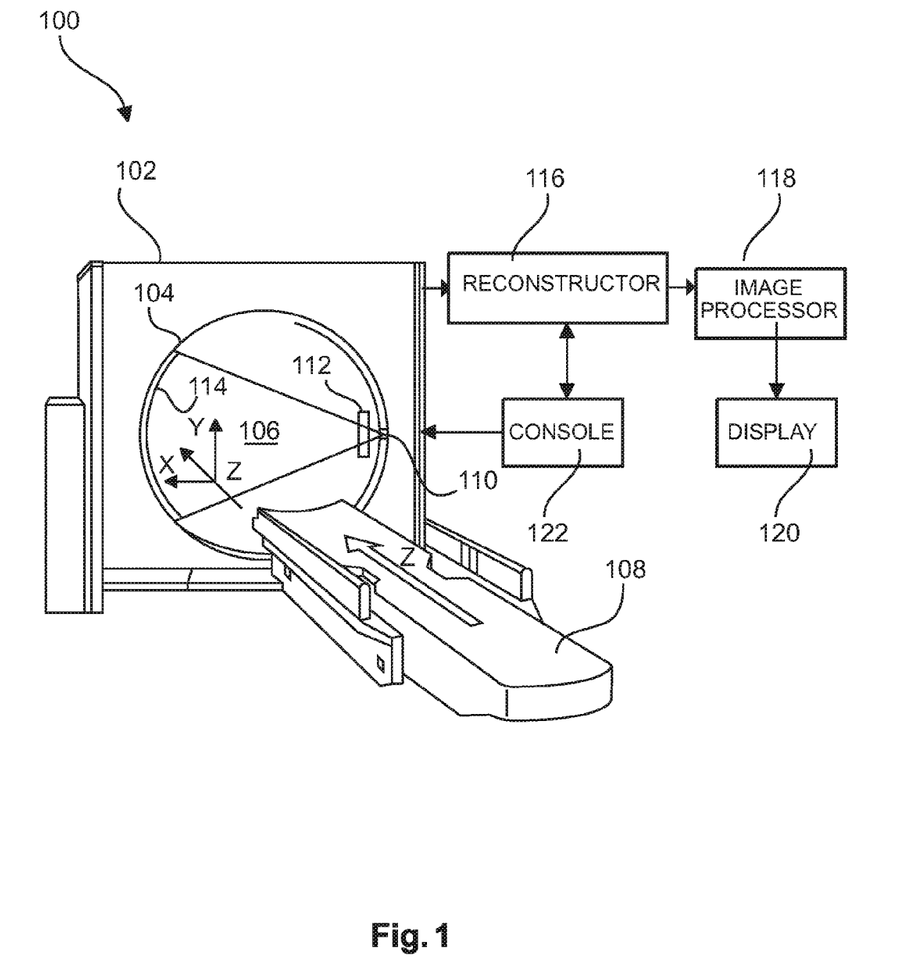
FIG. 1 shows schematically a computed tomography (CT) imaging arrangement.

FIG. 1 illustrates an imaging system 100 such as a computed tomography (CT) scanner. The imaging system 100 includes a stationary gantry 102 and a rotating gantry 104, which is rotatably supported by the stationary gantry 102. The rotating gantry 104 rotates around an examination region 106 (bore) about a longitudinal or z-axis. A support 108, such as a couch, supports a subject in the examination region 106 and can be used to position the subject with respect to x, y, and/or z axes before, during and/or after scanning.

A radiation source 110, such as an x-ray tube, is supported by the rotating gantry 104 and rotates with the rotating gantry 104 about the examination region 106, and emits radiation from a plurality of different projection angles/directions. In one embodiment there is a source collimator 112 is disposed between the x-ray tube and an examination region and collimates the emitted radiation to produce a fan or cone shaped x-ray beam. The collimated beam traverses the examination region and an object or subject therein which attenuates or otherwise changes (for instance, refracts) the beam as a function of the radiodensity (or the local refractive index) of the object or subject and illuminates a detector 114. The detector includes a radiation sensitive array of detector pixels. The detector is disposed across the examination region from the x-ray tube. The detector array may be 1D (that is, it includes a single row of detector pixels) or, preferably, is a 2D detector including a plurality of detector pixel rows.

The detector pixels then detect said beam after traversal of the object or subject to generate projection data indicative of the attenuation (or change) caused by matter in the object or subject (in the following referred to as only as the "imaging object" or simply the "object"). Because of the rotation of radiation source 110 around the object, projection data is detected for each projection angle. The rotation usually sweeps out a full circle or any desired arc segment less than 360°. The couch or gantry is advanced continuously or stepwise along the scan direction z (that passes through an isocenter in the object) and the above is repeated for a desired range of scan positions z on the z-axis. In an exemplary embodiment, the projection data PD (also referred to herein as the "measured data") produced by the detector is formed from a collection of sinograms each indexed or otherwise associated with the respective scan position on the scan direction z-axis. A sinogram is a structure where to each projection direction/rotation angle θ there is associated the projection raw image data as detected by the detector pixels at the respective angle θ). However this merely one embodiment of how the projection data PD may be structured. Other data structures for the projection data is also envisaged herein so long as the raw image data item associated with its respective pixel position, projection angle and scan position z is retrievable. In one preferred embodiment, the projection data is supplied in the scanner's original geometry as a data stream of projection views as detected by the detector pixels.

A reconstructor 116 reconstructs the projection data to generate a volumetric image data indicative of the object or subject. More particularly the Examination region in the scanner's bore is the "image space" defined by points in the scanner's bore where the object resides during imaging and where volumetric data is defined. The volumetric data is made up from trans-axial cross sectional slice images ("slices"), one slice for each scan position z. The image points within each slice are defined by (x, y) in-image coordinates in the respective reconstruction plane at scan position z. as shown in FIG. 1. Put differently, the reconstruction is essentially a transformation from projection space (where the sinograms are defined) into image space.

The reconstructor 116 is configured to utilize, at least, an iterative reconstruction algorithm with regularization. Generally, for an iterative reconstruction algorithm, an initial image (made up from voxels or other image elements defined in image space) is forward projected producing estimated projection data, the estimated projected data is compared with the actually measured projection data produced by detector, and the initial image is updated if the difference between the estimated projected data and the measured projection data does not satisfy predetermined stopping criteria. The above is repeated using the updated image until the stopping criteria is satisfied.

A suitable iterative statistical reconstruction algorithm incorporates a noise model. As described in greater detail below, in the illustrated embodiment, iterative statistical reconstruction algorithm incorporates reconstruction algorithm may be based on expectation-maximization (EM), maximum likelihood (ML), and/or other iterative reconstruction algorithm.

An image processor 118 processes the volumetric image data and generates one or more images indicative of the detected radiation. A display 120 is utilized to present the one or more images. A general purpose computing system serves as an operator console 122, and includes an output device such as a display and an input device such as a keyboard, mouse, and/or the like. Software resident on the console 122 allows the operator to control the operation of the system 100, for example, allowing the operator to select a protocol that employs the iterative statistical algorithm, identify a noise model for the iterative statistical algorithm, identify a weighting factor for the iterative statistical algorithm, initiate scanning, etc.

Figure 2:
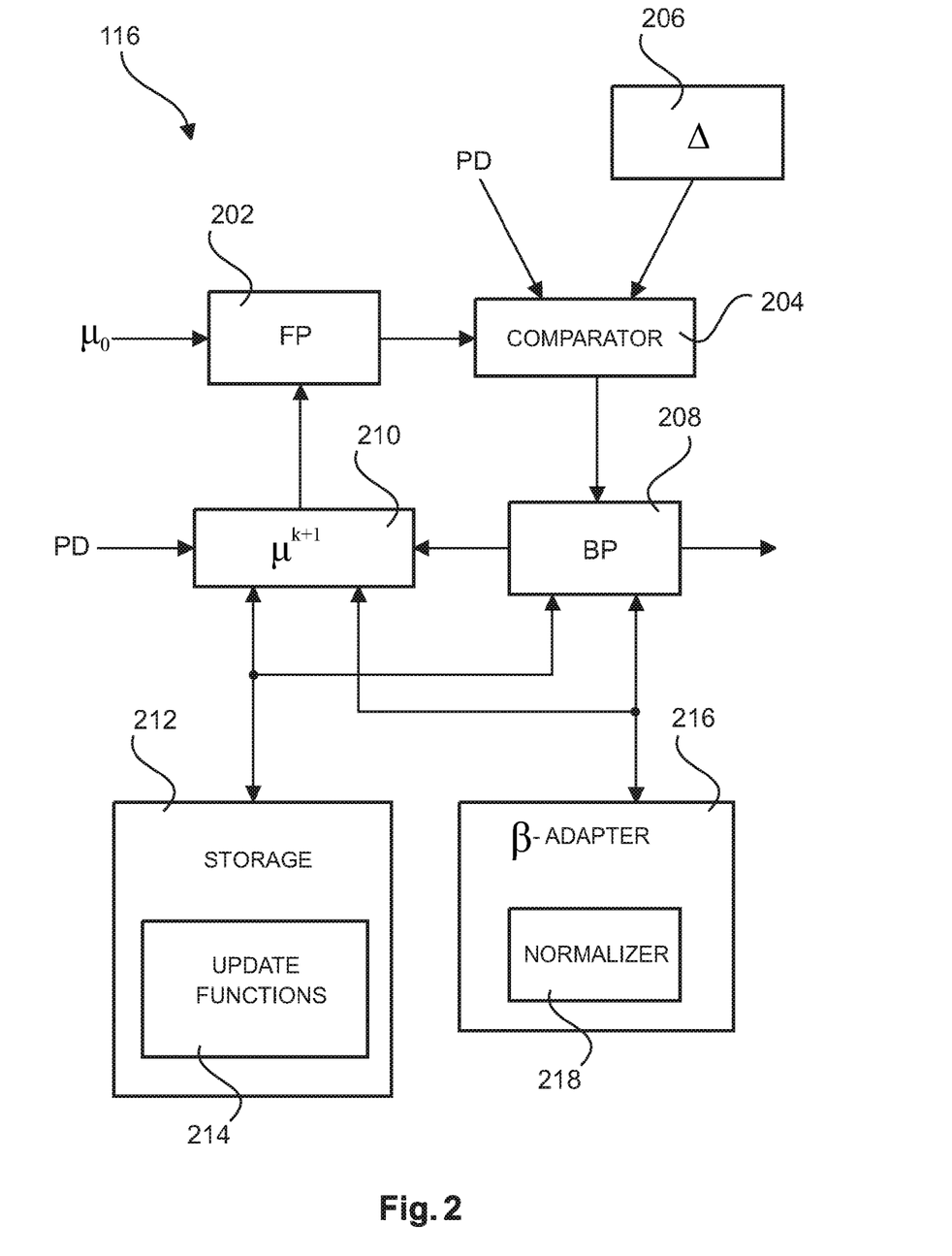
FIG. 2 shows a block diagram of an image reconstructor.

FIG. 2 illustrates broadly the general components of the reconstructor 116 according to one embodiment. The illustrated reconstructor 116 includes a forward projector 202 that forward projects an initial image to generate estimated projection data. A comparator 204 compares the estimated projection data with the measured projection data. A comparison between the estimated projection data and the measured projection data delivers correction data. The correction data is used to update the forward projected image (via a backprojector 208), and the updated image is used as input for the forward projector or as a final image, depending on predetermined stopping criteria 206. The backprojector 208 backprojects the difference to generate the updated image based on an iterative statistical reconstruction algorithm. The stopping criteria 206 may be based on the closeness of the forward projected data to the measured projection data, a number of iterations, and/or other stopping criteria.

An image updater 210 updates, according to an update function (on which more below), the current image based on the backprojected correction data and an update function 214 comprising a statistical model and a regularization method. Where the comparator 204 determines that the comparison satisfies the predetermined stopping criteria 206, this image is used as the final image. Where the comparator 204 determines that the comparison does not satisfy the predetermined stopping criteria 206, the iterative process continues with a new forward projection of the updated image via the forward projector 202 as described herein. In the illustrated embodiment, reconstruction algorithm storage 212 stores one or more statistically based update functions 214. The image updater 210 receives an initial image and processes the image using an iterative reconstruction algorithm with regularization. Regularization is via a regularization parameter that is used by the image updated 210. The regularization parameter is adapted by a regularization parameter adaptor ("beta adaptor") 216. To better explain operation of beta adapter, a brief summary of regularized iterative reconstruction is given in the following.

Iterative image reconstruction with regularization has been formulated through a cost function with a data fidelity term and a regularization term. The latter term is multiplied by a regularization factor $\beta$, and then both terms are added to determine a total cost, which is minimized. A generic cost function can be expressed as $C(\mu)=F(\mu)+\beta*R(\mu)$, where $\mu$ represents an image, $F(\mu)$ represents the data fidelity term, $R(\mu)$ represents the regularization term, and $\beta$ is a free parameter and represents the regularization factor that controls the strength of the regularization.

Broadly stated, the regularization term (or penalty term or "regularizer") is a function that responds to the noise level in an image and the response varies therewith: for instance, there is high response for high noise and low response for low noise. The regularization parameter is for adjusting the response of the regularization term to control image quality such as SNR or resolution.

For iterative reconstruction with regularization, the data fidelity term compares the forward projected image with the measured projections, optionally including a noise model on the projection.

Minimizing the cost function for instance by ML and assuming a Gaussian or Poisson model noise in the measured data leads generally to the following iterative expression:

$$\mu_j^{(n+1)} = \mu_j^{(n)} + \frac{\sum_{i=1}^{N_p}\left[a_{ij} \cdot \frac{1}{\sigma_i^2}(l_i - m_i^{(n)})\right] - \beta \cdot \dot{R}(\mu_j^{(n)})}{\sum_{i=1}^{N_p}\left[a_{ij} \cdot \frac{1}{\sigma_i^2} \cdot a_i\right] + \beta \cdot \ddot{R}(u_j^{(n)})} \quad (1)$$

wherein:—
j represents the voxel index;
n represents the iteration number;
$\mu_j^{(n)}$ represents the current value of the voxel j in volume/image $\mu$;
$\mu_j^{(n+1)}$ represents a next value of the voxel j.

The fraction term on the right of the iterative equation is called the "update term" or "update function". In the update term:

p represents the projection;
i represents the measurement in a projection p;
$a_{ij}$ represent the elements of the system matrix (the intersection of voxel j with the ray belonging to measurement i in a projection p); $a_{ij}$ is essentially a discretized version of the forward projector;
aj represent the forward projection of a unity image in a projection;
$\sigma_j^2$ represents the backward-projection of the statistical variance of the measurement i;
$m_i^{(n)}$ represents the measured values of the measurement i of a projection p,
$l_i$ represents the forward projection of the image;
$(l_i-\mu_j^n)$ is the difference at iteration n between the measured and forward projected data and determines whether the update term adds to or subtracts from current image;
$N_p$ represents the number of indices of all measurements in projection p for voxel j for which the system matrix elements are not zero.

The variances $\sigma_i^2$ of the projection data measurements may be obtained from the measurements themselves in combination with calibration measurements. The variances can then be collated into table structures. The variances can then be accessed and retrieved during the iterations as needs when computing the various terms of iteration equation (1).

As briefly observed above, the fraction term on right of iterative expression (1) is the update function or updater for the statistical reconstruction. It determines how a current image can be updated in the next iteration.

As can be seen from the structure of eq (1), the data (fidelity) term and regularization term of the update function can be re-found in the numerator of the update function, where the left summand of the numerator essentially corresponds to the data fidelity term and the right part of the numerator is the regularization term.

The data term is based on a statistical model of the performed measurements while the regularization term incorporates a-priory knowledge about the image to reconstruct. The magnitude of the data term is affected by the data fidelity which locally depends on the fidelity (variance) of the measurements in the projection data that contribute to the image at a certain location.

The regularization or penalty term R(.) represents the a-priori knowledge about the image to be reconstructed.

As used herein, "data (fidelity) term" includes any term within the functional or algorithmic structure of the update function that operates on projection data PD points. This is indicated by expressions in eq (1) that have single subscript i. In contrast, the regularization term R operates on image elements (shown as j expressions, eg voxels or blobs, etc) so operates in the image domain.

Although R is written as "R-dot" in equation (1), this is a non-limiting example only. In one embodiment, an approximation method has been used ("Paraboloidal Surrogates") to arrive at the update function in equation (1) which includes taking the derivate of R. Any function can be used and is envisaged herein, so long as its response behaviour to image input is as desired. For instance, the regularization term as applied in the iterative reconstruction typically favors smooth images (low frequency components over high frequencies) to accomplish noise reduction and is weighed by a regularization factor or parameter $\beta$. The factor $\beta$ (that is, a positive number) thereby adjusts a certain balance between the two terms. Due to the use of a statistical noise model, the data fidelity term varies strongly in magnitude within an image. This is due to the strongly varying statistical weights derived from the contributing measurements, as exemplarily represented by the usage of the $\sigma_i^2$, the variances of the measurements in the data term in the numerator of eqn. (1). There are at least two major, undesirable effects of this variability:

First, data fidelity has been observed to vary strongly from the centre towards the periphery when reconstructing for human slice images. At the periphery, the measured data is more trustworthy as the traversing rays encounter comparably little attenuation (and thus have a high fidelity) than is the case for rays traversing around the center. Data collected at the periphery therefore contributes to higher statistical weights and thus results in relatively high fidelity of the data term. This in turn results in a non-uniform noise distribution (higher noise in the peripheral region) as well as a non-uniform resolution (higher resolution in the peripheral region) in the final reconstructed image. In this situation, aiming for uniform resolution across the image as has been proposed elsewhere, has the following drawback: given a certain maximal noise level that would result in acceptable image quality in all parts of the image volume, the resolution is limited by the region with most noise. A result of forcing uniform resolution within a given slice may therefore result in a heavily over-smoothed peripheral region (that is, the region away from the rotation axis) and in an unacceptably non-uniform noise distribution. This is why this invention aims at a uniform noise distribution rather than a uniform resolution.

Second, when looking in scanning direction z, given the same photon flux, data fidelity in parts of the patient body with small extent (for instance, neck region) or low radiodensity (for instance, lung regions) may be far larger as compared to parts with larger extent (abdomen etc.) or higher radiodensity (such as bones). This can be partly compensated by modulating the photon flux based on a previously acquired scout scan. However, due to certain inaccuracies, this is not perfect and thus in real clinical data highly varying data fidelity along the scanning direction is common. Aiming for a uniform noise distribution and given a certain maximally acceptable noise level for body regions with low data fidelity, this may lead to a resolution that can be far below what is possible in body regions with high data fidelity. Even though the data fidelity is high and there is only little noise in the measurements, the slice is still smoothed as to match the overall acceptable noise level (as shown exemplarily in the slice shown in the bottom image of FIG. 4.a)) although a far better resolution would be expected at this location given the (locally) administered dose.

The above problems become even more pronounced in a low dose setting and/or in conjunction with non-linear regularization schemes, such as the Huber penalty. In case of photon starvation in certain body regions very strong regularization is required to prevent streak artifacts. For non-linear regularization terms, certain minimum regularization strength is required to prevent speckle ("salt & pepper") noise which also depends on the local data fidelity. Both effects lead to an over-smoothing in image regions with better noise characteristics (higher data fidelity) when aiming for a uniform noise distribution.

In order to address both of the above issues, the proposed beta adapter 216 is configured to:

adapt and vary in the image reconstruction plane, the regularization parameter beta is such a manner so that it acts on regularization term R to achieve more uniform noise in the reconstructed image.

normalize the adapted weights in scan direction z (that is, a scaling factor per slice) so as to maintain in a statistical sense, balance between the data term and the regularization term and thus enforce optimal dose utility and diagnostic value across all scan positions.

In order to better understand operation of beta adapter as proposed herein, reference is now made to the general equation for iterative reconstruction as per equation (1).

To better understand the rationale of the proposed beta adaption, the general function of the regularization parameter is briefly reviewed in more detail.

Typically the parameter beta is constant or at least spatially invariant (that is, is independent of image element coordinate j) and controls equilibrium at convergence between the data term (the left part of the numerator in equation (1)) and the regularization term (R-dot in the right part of equation (1)) to achieve convergence of the iterative reconstruction.

A typical penalty or regularization R measures the local variation ("roughness") in a small neighbourhood of a voxel j. In a fully converged image the numerator in equation (1) needs to be zero, thus the product of beta and the local roughness and the data term cancel each other out. Therefore, once converged and if beta was spatially invariant, the local roughness will vary according to the (spatially variant) size of the data term. But if beta is made to vary spatially in the same way the data term does, it is then the roughness R which will become spatially invariant. It is proposed herein then to vary beta spatially in such a manner so as to achieve the latter.

How exactly beta is made to vary herein will now be explained in more detail. Assuming then that we have a fully converged image, there is then, as briefly mentioned earlier, equilibrium between the contributions of data term and regularization term in the numerator of the above equation. The data term will include noise from the measured line integrals $l_i$. The statistical variance in the data term contributing to the numerator can be expressed via the variances of the measurements as:

$$\sigma_d^2(j) = \sum_{i=1}^{N_p} \frac{a_{i,j}^2}{\sigma_i^4} \cdot \sigma_i^2 \Longrightarrow \sigma_d(j) = \sqrt{\sum_{i=1}^{N_p} a_{i,j}^2 \cdot \frac{1}{\sigma_i^2}} \quad (2)$$

wherein the index "d" denotes the variance of the "data term".

The statistical variance of the data term, that is, the first part of the numerator in the update equation, varies according to the measurements $l_i$. Each of these measurements has a variance $\sigma_i^2$. Suppose the terms in (1) $m_i^{(n)}$ denote the forward projection of the fully converged (and thus constant for this purpose) image. Thus the variance of the sum of all the terms in the first part of the numerator yields, in approximation, equation (2). This data statistical variance as expressed by equation (2) is spatially variant, that is it depends on j. It is then assumed herein, that information about the noise in the converged image is captured by o reflected in the functional behaviour of the regularization term because the two terms can be considered to cancel each other when convergence is assumed as observed above.

For the regularization term contribution to the numerator to be constant at equilibrium, the spatial variance of the noise has to be captured by a scaling of a global beta term that reflects or follows the spatial variance as per eq. (2). It is therefore proposed herein to configure beta adapter 216 to compute a spatially varying regularization parameter for a given image element j according to:

$$\beta_j = \beta \cdot \sigma_d(j) = \beta \cdot \sqrt{\sum_{i=1}^{N_p} a_{i,j}^2 \cdot \frac{1}{\sigma_j^2}} \quad (3)$$

wherein β denotes a constant global regularization parameter that allows to adjust the regularization response to achieve a desired overall noise level. The global regularization parameter β is in one embodiment pre-set by a human user or can be found automatically as described in Applicants' WO 2013/088294 A1 In one embodiment, the adapted beta $\beta_j$ is computed by the square root of the backprojection of the inverse of the variances $\sigma_i^2$ of the projection data that correspond to image element j. The so adapted regularization parameter $\beta_j$ allows achieving approximately uniform local noise in essentially the same manner as the specific regularization term R captures image noise at image position j. In an alternative embodiment, the square root in equation (3) is replaced by an exponentiation with a positive exponent p (equation (3) being a particular embodiment for p=½) that can be chosen to adapt to specific applications or noise situations. In a yet further embodiment, the inverse of the variances is replaced by a parameterized function (with parameter q) of the variances, specifically the exponentiation (equation (3) being a particular embodiment for q=−1) of the variances with an exponent that can be chosen to adapt to specific applications or noise situations.

It is of note herein that the above convergence considerations do not depend on the specific way the regularization term in equation (1) is calculated. Applicant's experiments have shown good results for a range of different regularization term types and these included as embodiments herein. More specifically, according to one embodiment, R is the Huber penalty or is any other type of non-linear penalty that is based on (possibly weighted) sums or differences of image elements (voxels or blobs) in a neighbourhood of an image position j. For instance, according to one embodiment, R-dot can be a weighted sum of differences of a central voxel j to each of its neighbouring voxels although higher order variations and larger neighbourhoods are likewise envisaged herein. These are non-limiting exemplary embodiments for R and other types are likewise envisaged herein. According to one embodiment, beta adaptor computes $\beta_j$ based on terms in the update equation (1) as per the current or any previous iteration. As one example, the square root expression in (3) is approximated by the left term in the denominator of the update equation (1) from a previous iteration. When applying an ordered subset algorithm, an accumulation of the left term of the denominator in the update equation (1) over multiple or all subsets in a previous iteration is used. Using this approximation allows saving CPU time by replacing one full back-projection of the inverse variances above. However this is a non-limiting example as other terms can be likewise used in other embodiments as long as they suitably reflect (that is vary with) the noise level and/or behaviour of the projection data that correspond to the image point to be reconstructed.

According to one embodiment, beta adapter not only adapts beta within a slice but also adapts slice by slice along the scan direction to prevent significant over-smoothing (that is, too high betas) in regions of a reconstruction volumes (that extend along the scan direction regions) where the measurements become generally less noisy due to smaller patient/object dimensions or lower radiodensity. This applies in general to tapered structures which are imaged along their longitudinal axis or to regions with air enclosures like the chests of patients. This effect can be seen in the 2 lower images in FIG. 4.

To achieve this adaption along scan direction, beta adaptor includes in one embodiment a normalizer 216 module that operates to normalize the adapted $\beta(x,y,z)$ slice by slice using a scaling factor s(z). The scaling factors s(z) for each slice z (in scanning direction) are obtained from a mean (or weighted mean) of the $\beta(x,y,z)$ within a specific sub-region m(x,y,z) in the respective slice. The region m(x,y,z) is determined by applying a mask m to the respective $\beta(x,y,z)$ that allows focusing or restricting the normalization of the $\beta_j$ onto those regions that are of interest, such as soft tissue. Otherwise possibly regions of no interest would dominate the normalization with the adverse effect of diminishing or even nullifying the intended outcome. The mask is in general different for each slice z.

Figure 3:
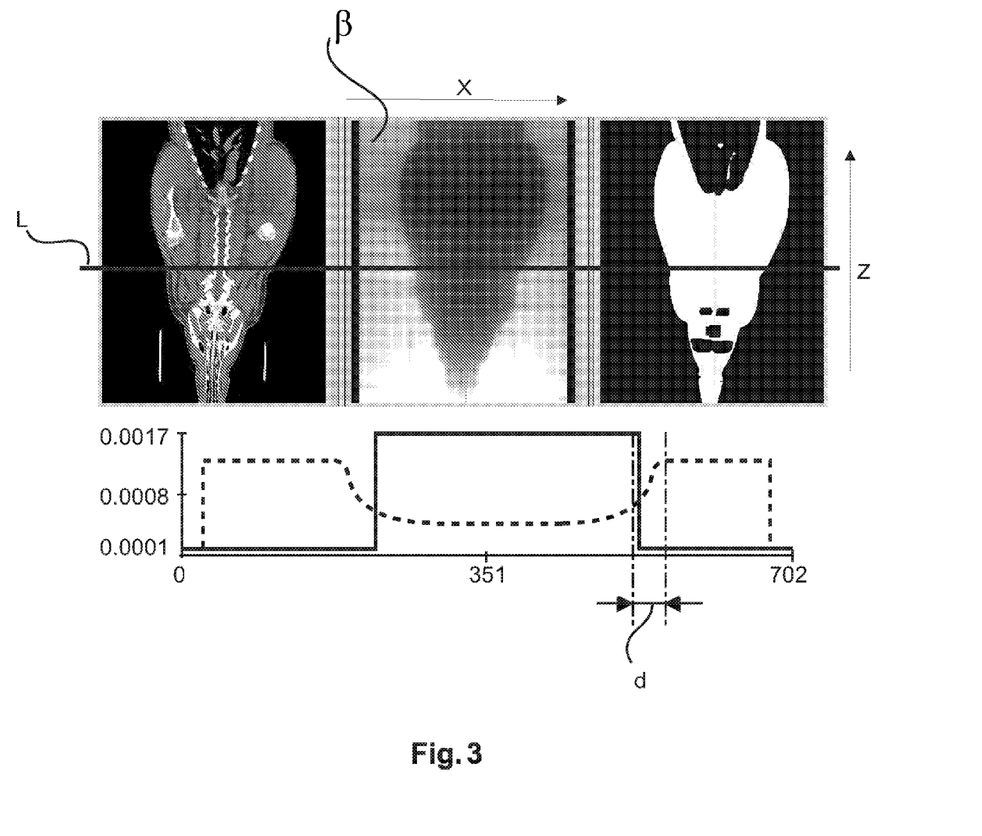
FIG. 3 shows images produced by reconstructor of FIG. 2.

An example of such a mask is shown in the rightmost image in FIG. 3. This mask can be obtained in any way that is suitable to segment the regions that are of interest, such as soft tissue. In the example below, the mask (which is essentially an index function) is obtained in one embodiment via thresholding of the image volume of attenuation values to obtain a template for mask m at position z. In one embodiment, there is a subsequent step of "eroding" this template to exclude further portions in that slide and to further restrict the set of those $\beta(x,y,z)$ in slice z on which the computation of the scaling factor s(z) is to be based as will now be explained in more detail. It is the so eroded template (as defined by the mask) that then exclusively defines the set or regions of all $\beta$ values relative to which the scaling factors s for the normalization are then to be computed.

According to one embodiment the mask is computed by thresholding to segment body regions. The segmented image is then eroded by morphological operations to exclude inner or outer peripheral regions of the ROI. The excluded regions are not representative of the variance of the data term with respect to those regions of diagnostic or other interest where noise is to be controlled for improved image quality. This is due to the many tangential measurement rays that see only little attenuation. Other regions that are not of interest are likewise excluded by thresholding and/or subsequent erosion, for instance, background image data that represents the empty space in the bore surrounding the patent or object. By "inner" peripheral regions, the border portion of cavities are meant. Within each slice, the scaling factor s(z) is then determined as the reciprocal of the mean of those $\beta_j$ (as determined via equation (3) or other approximations as described above) within the eroded mask from the same slice. That is, the mask/index function is multiplied with the $\beta_j$ and the mean of the beta values is determined for each slice to arrive at the s(z). Subsequently s(z) is applied by multiplying all $\beta_j$ from each slice with the corresponding s(z) from the same slice. As a result, the mean value of the betas within the region of interest is approximately constant over z (for each slice) and, therefore, the manner in which the data term and regularization term balance each other during the iterations is maintained essentially constant across z.

The region m(x,y,z) is a cross section of a region of interest ROI in the respective slice with the understanding that said ROI will normally extend across a number of slices and the computations described above in respect of the normalization (including the mask computations) will need to be executed for each slice of the ROI.

Figure 4:
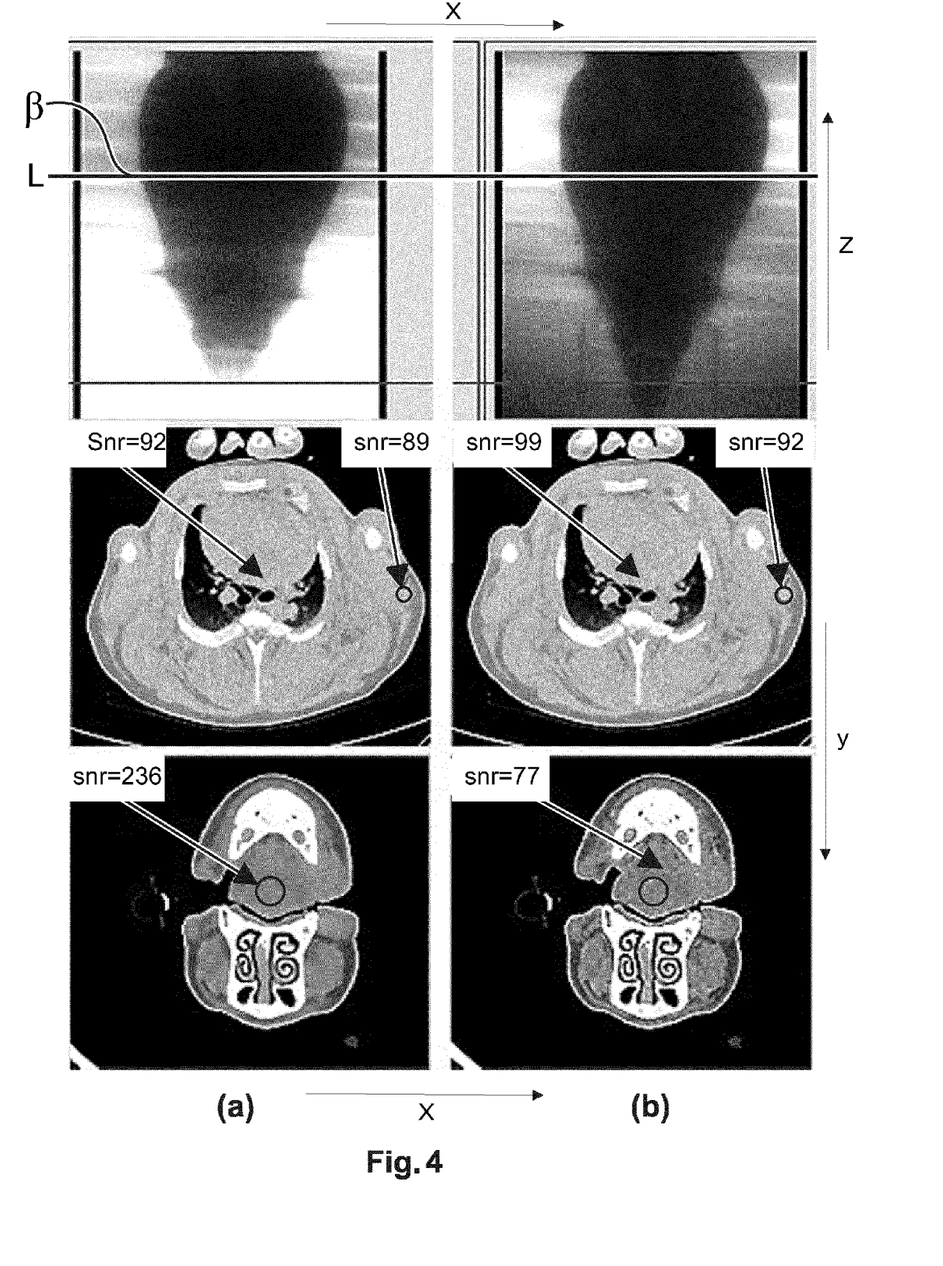
FIG. 4 shows further images produced by reconstructor of FIG. 2.

In one embodiment the mask is determined on a reference image previously obtained from a traditional reconstruction like filtered back projection. In an alternative embodiment the iterative reconstruction proceeds on the basis of a global spatially invariant beta only for a number of k initial iterations, and the mask is then determined on the updated image for the k-th iteration. The parameter k for the initial iterations is either fixed by an application specific protocol, or is determined adaptively via image quality measures or indicated by a user. For instance, the user may review the sequence of updated images generated during execution of the iteration and then chooses by mouse-click or other UI means a desired one of the updated images (for instance, one that already shows in sufficient detail the ROI) from which the mask is to then computed by normalize 216. The normalization operation of normalizer 218 is illustrated in the example of FIG. 3. The left image in the upper shows the reference image on which the mask computation is based, either pre-computed (for instance from silhouette data taken from a scout image or cross-sectional images obtained by a previous reconstruction such as, but not limited to, a conventional FBP reconstruction) or taken from any previous iteration as described above. The image to the right shows the computed mask with regions of interests are shown in white in the blocked out regions of non-interest are shown in black. The central image shows the calculated $\beta_j$, shown here before normalization along z as indicated in FIG. 3 is applied as can be seen by the much higher values (brighter parts) in the lower part of the image. The curve (dotted line) in the lower row shows a line profile curve of the $\beta_j$ where beta values are plotted versus a line L across the image plane at a specific scan position z from the central image above. The corresponding mask or indicator function of the region of interest is shown in solid lines. For the calculation of the scaling factors s(z) only those $\beta$s are taken into account for which the indicator function is nonzero. The curve also shows that the periphery of the patient in that slice is not part of the region of interest and will not be considered in the normalization (calculation of s(z)) for the reasons as explained above. Using thresholding to define the mask is an exemplary embodiment only and other methods are likewise envisaged herein. For instance, in another embodiment, after computing per equation (3) the $\beta_j$, the mask for normalization is computed from the calculated $\beta_j$ instead of from the image points of attenuation values. This is done by identification of transition regions where high beta values change into low beta values or vice versa in a gradient image derived from the image of the $\beta_j$ or a relative thresholding on the $\beta_j$ relative to the values in the peripheral and inner regions. In this manner, image points that represent background or air cavities can be identified as high beta regions and the transition region d identifies outer or inner peripheral region. The mask can then be defined by returning zero for image points in the transition region and the high beta region. In other words, in the previous thresholding embodiment, the ROI has been identified based on voxel values of image points wherein in the instant embodiment identification is based on the regularization parameter that has been assigned by the beta adaptor 216 to the respective image point. In either of the embodiment, the width d of the periphery excluded by mask are in general based on empirical values and are in general dependent on the patient's size and extent in the slice under consideration. FIG. 4 shows an example of the effect of the proposed scaling in scan direction. In both columns, the beta are varied within the image plane, in the left column, (a) there is no scaling in scanning direction z which is then applied in column (b). The upper row shows the locally varying $\beta$ values in the central x-z plane, middle and lower row show the slice images as marked in the upper row. In case (a) the higher $\beta$ values can be observed in regions of smaller spatial extent leading to over-smoothing and loss in resolution (lower slice images). This is remedied in (b). The normalization thus effectively prevents relative over-smoothing in the lower images. Operation of reconstructor 116 in respect of beta adapter 218 is now explained with reference to FIG. 5.

Figure 5:
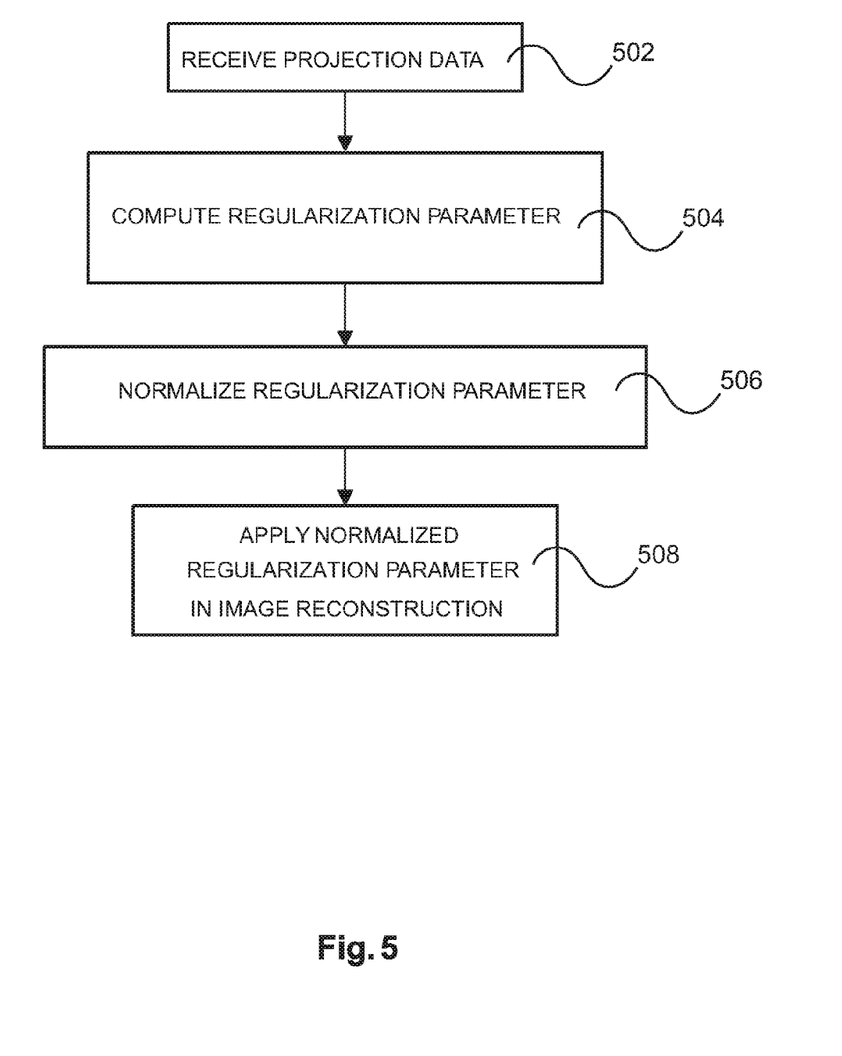
FIG. 5 shows a flow chart of an image processing method.

Projection data PD is received at S502 for (not necessarily contiguous) specific scan positions along a scan direction z. Image points of an image volume are reconstructable from the projection data in an iterative reconstruction operation. The projection data covers an extent of an object or subject (eg a patient) that resides in an image scanner's bore during the scan thus defining the volume to be reconstructed into a image volume. The method operates in the k-the iteration step on image points of an initial volume (k=1) or on image points of a volume reconstructed in a previous iteration step (1<k).

As a function of a position in said volume, a regularization parameter is computed in step S504 by beta adapter 216 for an image point at said position. The regularization parameter is for application in a next iteration in said iterative reconstruction operation. In other words, regularization parameter is spatially (that is, across the volume) adaptive or variant.

As a function of the scan position (that is, z-position within the image volume), the regularization parameter is normalized by a normalizer 218 at step S506 relative to region of interest in a plane across the volume at said scan position. The region of interest is in one embodiment a particular tissue type of anatomical structure or region in a human or animal patient. In one embodiment, the plane may be a slice or any plane perpendicular through the z direction (scan direction).

Said normalized regularization parameter, is then applied, as per eq (1), in step S508 by image updater 210 in one or more of the next iterations in the iterative reconstruction operations on the projection data to reconstruct said image point in the volume. In one embodiment, the reconstruction operation is based on a data term and regularization term. The regularization parameter is so computed at step 504 that it essentially follows or corresponds to the variance of the data term. The data term's variance is taken as an indication for the noise behavior and noise level in the projection data which is reconstructable into said image point in the volume.

In one embodiment said regularization parameters are computed on a coarse grid (that is, a grid of positions of points in the image volume) that differs in resolution from the image grid for time image points used for the actual reconstruction of the image volume. The resolution of the coarse grid representation of the regularization parameters will be typically lower than the image volume representation and serves the primary purpose of saving memory space otherwise needed for a full resolution representation. Upon calculation of the update equation (1), the regularization parameter $\beta_j$ is calculated in one embodiment on-the-fly by interpolation from the actually computed and represented values. In one embodiment, a linear interpolation is used however the method is not limited to a particular interpolation scheme.

In one embodiment, an ordered subset iteration scheme is used for the iterations and the regularization parameters are updated with each iteration but may remain constant for a number of iterations in alternative embodiments. Triggering the updates for the re-computation and or re-normalization of the regularization parameters is either via user issued signal or protocol based or can be triggered in response to the deviations between the forward projected image estimates and the projection data is established by comparator 204. Also, the regularization parameters need not be computed from the start but until after a number of iterations. In this case, the iterative reconstruction commences with a predetermined default value and/or user defined regularization parameter and terms from the update equation, calculated during the updates in the first iterations, are accumulated and used to compute the regularization parameters as per steps S504. All the same the normalization need not be performed from the start but only until after a number of iterations. In this case the updated image after a number of iterations is used to determine the ROI needed for the normalization operation S506.

It will be understood that steps S504-S508 are in general applied simultaneously or concurrently to each image point in the volume. The image volume on which step S504 is based may not necessarily be one reconstructed in a previous iteration but may be an initial volume ($\mu_0$) reconstructed by a conventional FBP or by any other reconstruction method. Also, "next iteration" or "previous iteration" does not necessarily indicate the immediately previous iteration of the "immediate next" iteration. Also as used herein "reconstructed image volume" or "reconstructed image point" does in the present context not necessarily mean that said volume or image point are the final output as produced by the method or apparatus as proposed herein but rather that said volume or image point are an output or produced after a certain number of iterations k ($\geq 1$). Whether or not the volume is the final output or not is defined by the stopping criteria 206.

Also, in one embodiment, the projection data encodes attenuation line integrals obtained by applying a "phase retrieval" step on detector signals detected by using phase contrast imaging PCT equipment such as an interferometer in the scanner system 100. In one embodiment gratings are arranged on the detector. A suitable signal processor then processes said signals from which three sets of projection data are derived: one for attenuation, one for small angle scattering and one for differential phase shift. The method as proposed herein can then be applied to the reconstruction of any of the three different projection data. The projection data variances as used in equation (3) are then taken from the variances of the corresponding projection data to be reconstructed. The identification of the ROI to compute the scaling factors is then computed via an image reconstructed from the corresponding attenuation projection data as explained herein, and the mask is then mapped to the differential phase shift contrast or small angle scattering image. For reconstruction, an iterative reconstruction for phase contrast imaging as described for instance in T Köhler et al in "Iterative Reconstruction for Differential Phase Contrast Imaging using spherically symmetric basis functions", Med Phys 38(8), 2011, pp 4542 is then used, additionally making use of the spatially varying and normalized regularization parameters as described herein.

In phase contrast imaging, the functional structure of the terms that include the variances will in general differ from the from the exemplary embodiment as per equations (2)(3). In phase contrast imaging, the variances can be estimated from the phase contrast projection data as per $2/[(mean\ intensity(projection\ data\ entry\ for\ pixel\ x,y)*n*V^2]$ as defined in equations (26),(29—matrix entry at row 2, column 2) by Weber et al in "Noise in x-ray grating-based phase-contrast imaging", Medical Physics, Vol. 38, No. 7, July 2011. V is the visibility and n is the Talbot order, with n=1, 3, or 5 or 7. n=9 is also envisaged in some embodiments.

The image processor 116 and its components may be arranged as separate modules arranged in a distributed architecture and connected in a suitable communication network.

In one embodiment, image processor IP is arranged as dedicated FPGAs or as hardwired standalone chips.

In an alternate embodiment, image processor IP and its components are resident in work station CON running as software routines thereon. Image processor IP and its components may be programmed in a suitable scientific computing platform such as Matlab® and may be translated into C++ or C routines maintained in a library and linked when called on by work station CON's operating system.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A CT image processing method, including the following steps of:
   receiving projection data acquired of a volume along a scan direction, one or more image points of said volume reconstructable, in an iterative reconstruction operation, from at least a part of said projection data;
   as a function of a position in a volume reconstructed in a previous iteration or otherwise reconstructed, computing a regularization parameter for an image point at said position for a next iteration in said iterative reconstruction operation;

as a function of a scan position along the scan direction, normalizing the regularization parameter relative to a region of interest, ROI, of an object in a plane across the volume at said scan position, the ROI defined by a mask m, wherein the normalizing is via a mean or a weighted mean of the regularization parameter; and when iteratively reconstructing, in said next iteration, said image point from the projection data, applying said normalized regularization parameter, wherein the regularization parameter is computed from a parameterized first function of one or more back-projections of a parameterized second function of spatial variance of noise obtained from the projection data, and the parameterized first function comprises an exponential function with a fixed or an adjustable positive exponent parameter, wherein the positive exponent parameter is less than 1.

2. The method of claim 1, wherein the computing of the regularization parameter is a function of noise behavior or noise level in the projection data.

3. The method of claim 1, further including the step of identifying said ROI in a cross-sectional image through a volume from the or any previous iteration or from a reference cross-sectional image previously obtained by a different reconstruction method.

4. The method of claim 1, wherein the normalization step includes:

computing regularization parameters for a further image point in the ROI and for further image points in the ROI in a second plane at a second scan position such that the mean or the weighted mean of the regularization parameters relative to said ROI in the first plane essentially equal the mean or a weighted mean of the regularization parameters relative to said ROI in the second plane.

5. The method of claim 1, wherein said ROI is pre-computed or user defined based on the volume or on a volume from any previous iteration or is pre-computed from a cross-sectional image reconstructed in a previous iteration.

6. The method of claim 1, wherein the region of interest is i) a portion of the object of a specific tissue type, in particular soft tissue, or ii) a specific anatomical region or structure.

7. The method of claim 1, wherein the ROI excludes i) image data representative of a peripheral region of said object in said plane or ii) excludes image points representative of an object portion having an attenuation coefficient lower than a threshold or iii) excludes image data representative of object background.

8. The method of claim 1, wherein the parameterized second function comprises an inverse of the statistical variances obtained from the projection data.

9. The method of claim 1, wherein the exponent parameter is ½.

10. The method of claim 1, wherein the computing of the regularization parameter and/or the corresponding normalization includes re-using one or more terms, said one or more terms previously formed in the or a previous iteration for updating a previous estimate for the image point.

11. The method of claim 1, wherein the regularization parameter is computed and represented at a lower resolution than that of the reconstructed image volume, wherein the regularization parameter as applied in the reconstructing step is retrieved via interpolation from said lower resolution regularization parameter.

12. The method of claim 1, wherein the projection data is obtained from a differential phase contrast imaging operation.

13. An image processor apparatus configured to process projection data according to the method of claim 1.

14. A non-transitory computer readable medium having stored thereon a computer program which, when executed by a processor, is adapted to perform the method of claim 1.

* * * * *